(12) United States Patent
Sasaki

(10) Patent No.: US 11,759,871 B2
(45) Date of Patent: Sep. 19, 2023

(54) CUTTING TOOL

(71) Applicant: TUNGALOY CORPORATION, Fukushima (JP)

(72) Inventor: Yasutake Sasaki, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/670,013

(22) Filed: Feb. 11, 2022

(65) Prior Publication Data
US 2022/0347768 A1 Nov. 3, 2022

(30) Foreign Application Priority Data
Apr. 28, 2021 (JP) .................................. 2021-075860

(51) Int. Cl.
*B23B 27/22* (2006.01)
*B23B 27/14* (2006.01)
*B23C 5/10* (2006.01)

(52) U.S. Cl.
CPC ............ *B23C 5/109* (2013.01); *B23B 27/143* (2013.01); *B23B 27/22* (2013.01); *B23B 2200/081* (2013.01)

(58) Field of Classification Search
CPC ....... B23B 27/22; B23B 27/14; B23B 27/143; B23B 2200/0447; B23B 27/1611;
(Continued)

(56) References Cited

U.S. PATENT DOCUMENTS 5,449,255 A * 9/1995 Katbi .................... B23B 27/143
407/115
5,476,346 A * 12/1995 Lundstrom ........... B23B 27/143
407/116
(Continued)

FOREIGN PATENT DOCUMENTS

EP 3421160 A1 * 1/2019 ........... B23B 27/143
JP 2004106150 A * 4/2004
(Continued)

*Primary Examiner* — Sara Addisu
(74) *Attorney, Agent, or Firm* — Studebaker & Brackett PC

(57) ABSTRACT

There is provided a cutting tool in which chip control is improved. A cutting edge member includes a first wall surface which includes a concave surface which is formed to be depressed in a direction away from an intersection point of an imaginary plane and a corner portion and toward the center of a cutting insert in an end view when viewed from a direction facing an end surface, a second wall surface which includes a convex surface which is provided to be connected to the first wall surface at a position spaced apart from the imaginary plane and is protruded in a direction away from the center of the cutting insert in the end view, a third wall surface which includes a convex surface which is provided to be connected to the first wall surface at a position spaced apart from the imaginary plane on an opposite side to the second wall surface across the imaginary plane and is protruded in a direction away from the center of the cutting insert in the end view, and a fourth wall surface which is provided in an area between the first wall surface and the intersection point in the end view, includes a convex surface which is protruded in a direction away from the center of the cutting insert in the end view, and has a height smaller than heights of the second wall surface and the third wall surface in a side view when viewed from a direction facing a side surface.

6 Claims, 7 Drawing Sheets

(58) Field of Classification Search
CPC ............ B23B 27/145; B23B 2200/081; B23B 2226/31; B23B 27/1644; B23B 27/16; B23B 27/1618; B23B 27/1622; B23B 2200/201; B23B 2200/321; B23B 2200/325; B23B 27/20; B23B 2200/0428; B23B 2200/0495; B23B 2200/161; B23B 2200/163; B23B 2200/323; B23B 2200/328; B23C 5/109; B23C 2210/486; B23C 2200/201

See application file for complete search history.

(56) References Cited

U.S. PATENT DOCUMENTS

| | | | | |
|---|---|---|---|---|
| 5,743,681 | A * | 4/1998 | Wiman | B23B 27/143 |
| | | | | 407/116 |
| 5,947,651 | A * | 9/1999 | Murakami | B23B 27/143 |
| | | | | 407/115 |
| 7,524,148 | B2 * | 4/2009 | Okita | B23B 27/143 |
| | | | | 407/115 |
| 8,939,684 | B2 * | 1/2015 | Chistyakov | B23B 27/045 |
| | | | | 407/115 |
| 10,286,455 | B2 * | 5/2019 | Tomoda | B23B 27/20 |
| 10,486,239 | B2 * | 11/2019 | Sasaki | B23B 27/22 |
| 11,027,339 | B2 * | 6/2021 | Ikeda | B23B 27/22 |
| 11,338,371 | B2 * | 5/2022 | Moroguchi | B23B 27/145 |
| 2012/0128438 | A1 * | 5/2012 | Tanaka | B23B 27/141 |
| | | | | 407/115 |
| 2012/0275869 | A1 | 11/2012 | Yamazaki et al. | |
| 2015/0090081 | A1 * | 4/2015 | Onodera | B23B 27/143 |
| | | | | 407/66 |
| 2018/0009040 | A1 | 1/2018 | Sasaki | |
| 2021/0146451 | A1 * | 5/2021 | Larsson-Fritz | B23B 27/1611 |
| 2021/0323074 | A1 * | 10/2021 | Ikeda | B23B 27/1611 |
| 2022/0001455 | A1 * | 1/2022 | Ikeda | B23B 27/141 |
| 2023/0191499 | A1 * | 6/2023 | Kim | B23B 27/143 |
| | | | | 407/30 |

FOREIGN PATENT DOCUMENTS

| | | | | |
|---|---|---|---|---|
| JP | 2008-213122 | A | | 9/2008 |
| JP | 2019206053 | A * | 12/2019 | |
| WO | WO-2010021155 | A1 * | 2/2010 | ......... B23B 27/143 |
| WO | WO-2014192798 | A1 * | 12/2014 | ......... B23B 27/143 |
| WO | 2016/136694 | A1 | | 9/2016 |
| WO | WO-2017052208 | A1 * | 3/2017 | ......... B23B 27/143 |

* cited by examiner

CUTTING TOOL

BACKGROUND

Field

The present invention relates to a cutting tool.

Description of Related Art

Conventionally, there is known a technique for improving chip control.

For example, WO 2016/136694 discloses a chip breaker having a breaker wall surface on which a convex surface is formed at a position spaced apart from an imaginary plane which is determined so as to halve a corner portion.

SUMMARY

However, when cutting is performed with a cutting insert described in WO 2016/136694, there may be a case where it is difficult to adequately control chips. It has been found out that, in particular, when a depth of cut is increased, there are cases where chips are not properly broken.

To cope with this, an object of the present invention is to provide a cutting tool having improved chip control.

The present application discloses a cutting tool. The cutting tool includes at least a cutting edge member. The cutting edge member includes: a cutting edge which is formed in a corner portion of a connection portion which connects an end surface and a side surface; a first wall surface which includes a concave surface which is provided at a position through which an imaginary plane determined so as to halve the corner portion passes, and is formed to be depressed in a direction away from an intersection point of the imaginary plane and the corner portion in an end view when viewed from a direction facing the end surface; a second wall surface which includes a convex surface which is provided to be connected to the first wall surface at a position spaced apart from the imaginary plane, and is protruded in a direction opposite to the direction in which the concave surface is depressed in the end view; a third wall surface which includes a convex surface which is provided to be connected to the first wall surface at a position spaced apart from the imaginary plane on an opposite side to the second wall surface across the imaginary plane, and is protruded in a direction opposite to the direction in which the concave surface is depressed in the end view; and a fourth wall surface which is provided in an area which is between the first wall surface and the intersection point in the end view and through which the imaginary plane passes, includes a convex surface which is protruded in a direction opposite to the direction in which the concave surface is depressed in the end view, and has a height smaller than heights of the second wall surface and the third wall surface in a side view when viewed from a direction facing the side surface.

When, of directions parallel to the imaginary plane, a direction toward the corner portion from the center of the cutting edge member is referred to as the front and a direction opposite to the above direction is referred to as the rear, the direction away from the intersection point of the imaginary plane and the corner portion corresponds to the rear, and the direction opposite to the direction in which the concave surface is depressed corresponds to the front. Accordingly, it can be said that the first wall surface has the concave surface which is depressed to the rear, and each of the second wall surface, the third wall surface, and the fourth wall surface has the convex surface which is protruded to the front.

In the cutting tool, a line obtained by cutting the fourth wall surface with a second imaginary plane perpendicular to the imaginary plane may have an arc shape or an elliptical arc shape.

In the cutting tool, the cutting edge member may be provided such that a cross section obtained by cutting the cutting edge member with the imaginary plane shows: the corner portion or the cutting edge; a breaker bottom surface which is provided between the corner portion or the cutting edge and the fourth wall surface; the fourth wall surface which is connected to the breaker bottom surface and moves upward with increasing distance from the corner portion or the cutting edge; a connection surface which is connected to the fourth wall surface; the first wall surface which is connected to the connection surface and moves upward with increasing distance from the corner portion or the cutting edge; and a boss surface which is connected to the first wall surface and has a height larger than the height of the fourth wall surface.

The cutting tool may further include, in addition to the cutting edge member, a cutting insert which has a base insert to which the cutting edge member is mounted, and, in the cutting insert, a through hole having a central axis which is present in the imaginary plane may be formed in the base insert.

The cutting tool may further include, in addition to the cutting edge member, a cutting insert which has a base insert to which the cutting edge member is mounted, the cutting insert may be formed into a polygonal shape in the end view when viewed from the direction facing the end surface, and the corner portion may be formed at a vertex of the polygonal shape.

The cutting tool may further include a holder which holds the cutting edge member.

The cutting tool may also be a turning tool. The cutting tool can be used in cutting such as outer diameter machining, end surface machining, copying, or inner diameter machining.

The present application discloses a cutting edge member. The cutting edge member includes: a cutting edge which is formed in a corner portion which connects an end surface and a side surface; a first wall surface which includes a concave surface which is provided at a position through which an imaginary plane determined so as to halve the corner portion passes, and is formed to be depressed in a direction away from an intersection point of the imaginary plane and the corner portion in an end view when viewed from a direction facing the end surface; a second wall surface which includes a convex surface which is provided to be connected to the first wall surface at a position spaced apart from the imaginary plane, and is protruded outward in the end view; a third wall surface which includes a convex surface which is provided to be connected to the first wall surface at a position spaced apart from the imaginary plane on an opposite side to the second wall surface across the imaginary plane, and is protruded outward in the end view; and a fourth wall surface which is provided in an area which is between the first wall surface and the intersection point in the end view and through which the imaginary plane passes, includes a convex surface which is protruded outward in the end view, and has a height smaller than heights of the second wall surface and the third wall surface in a side view when viewed from a direction facing the side surface.

DETAILED DESCRIPTION

Hereinbelow, an embodiment of the present invention will be described by using the drawings. The following embodiment merely represents an example for describing the present invention, and it is not intended to limit the present invention only to the embodiment.

Figure 1:
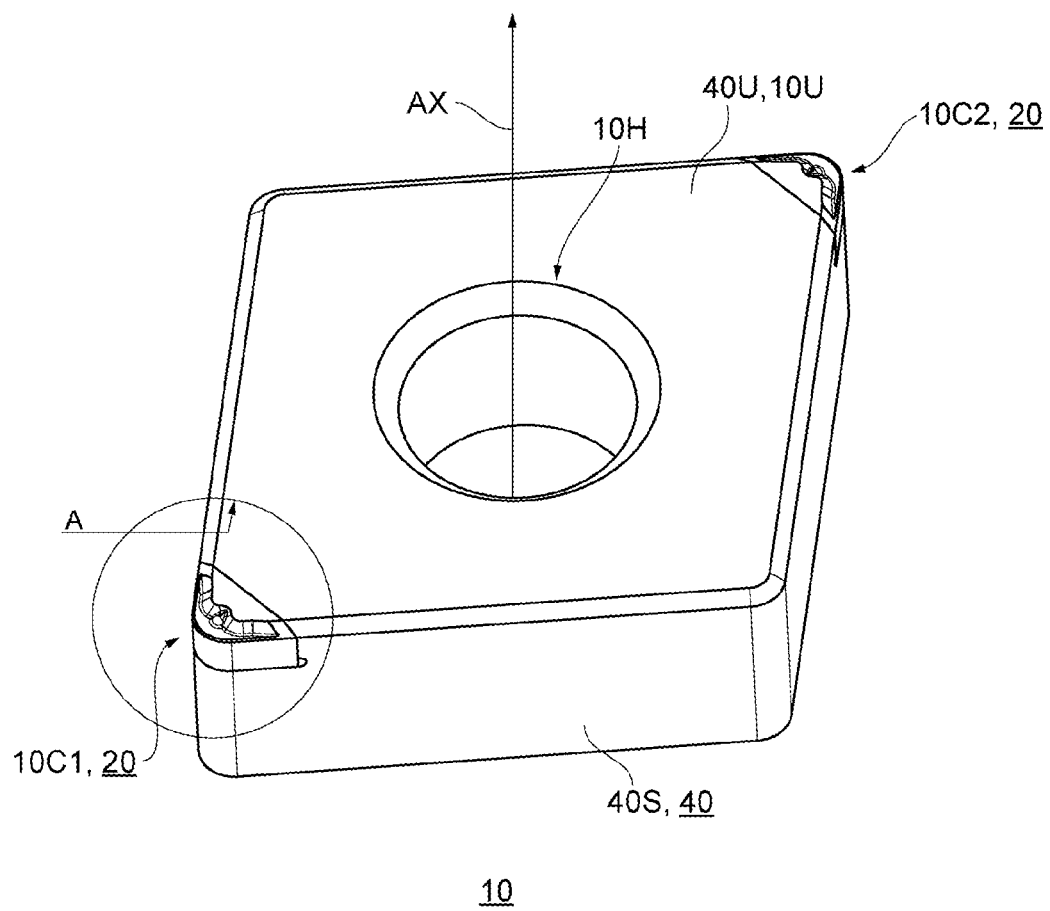
FIG. 1 is a perspective view of a cutting insert according to an embodiment.
Figure 2:
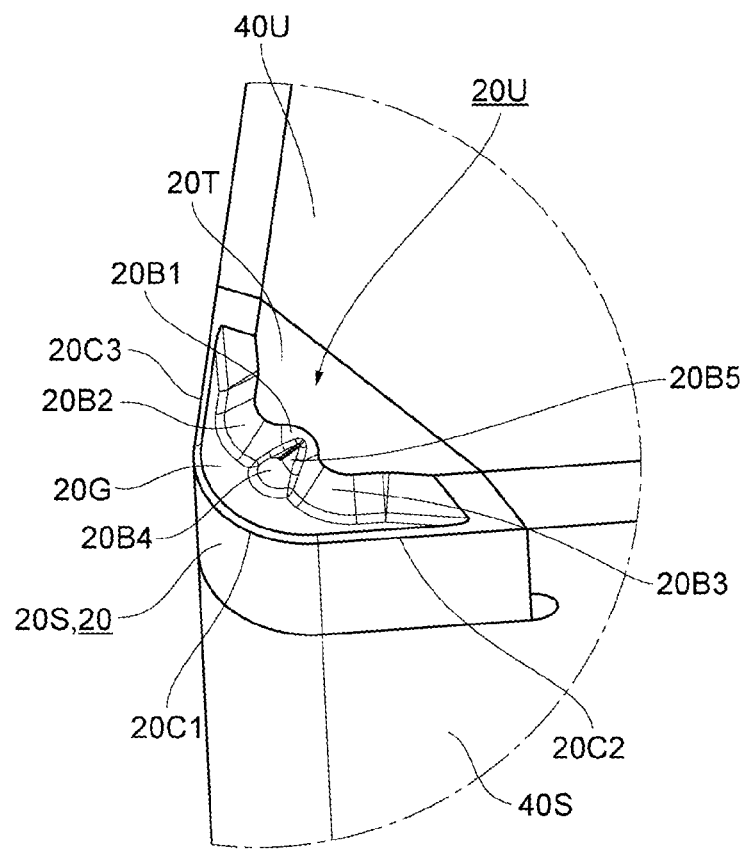
FIG. 2 is an enlarged perspective view of the cutting insert according to the embodiment.
Figure 3:
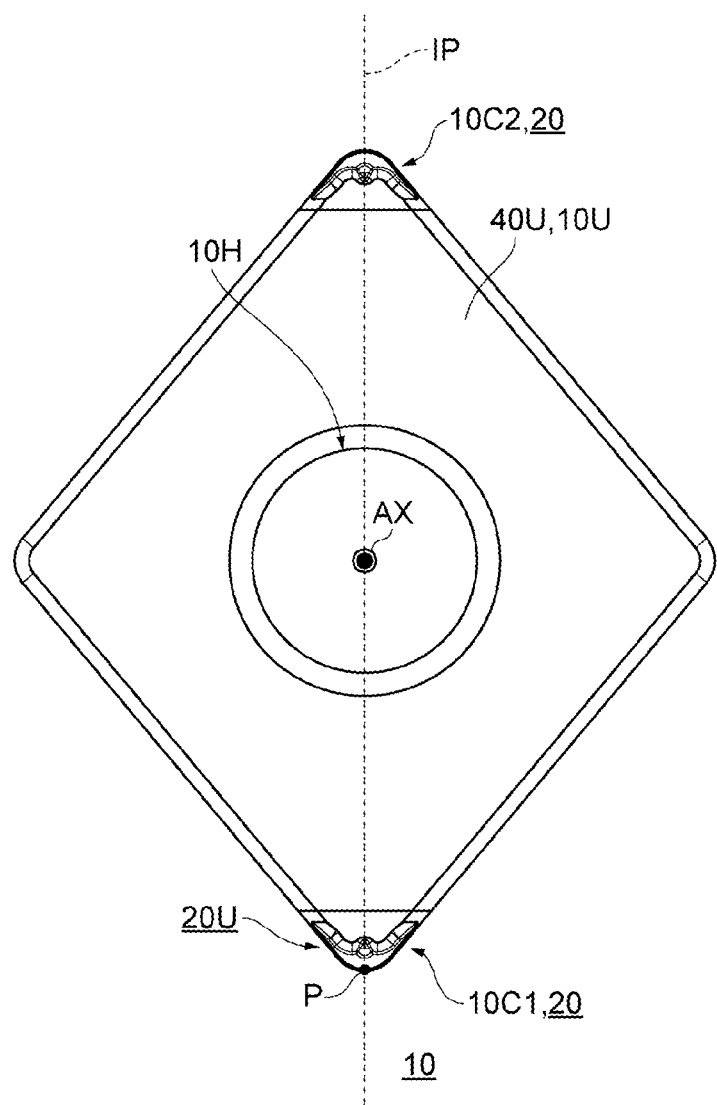
FIG. 3 is a plan view (top view) of the cutting insert according to the embodiment.
Figure 4:
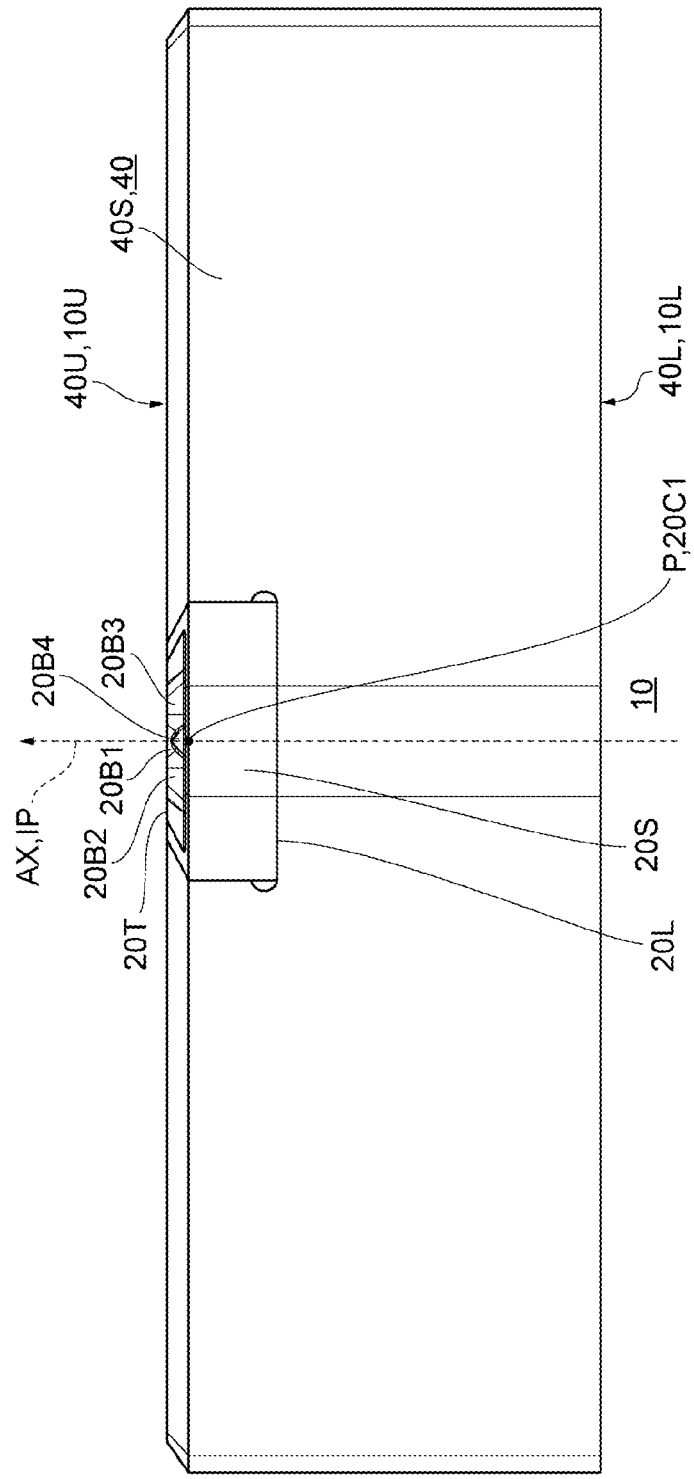
FIG. 4 is a front view of the cutting insert according to the embodiment.
Figure 5:
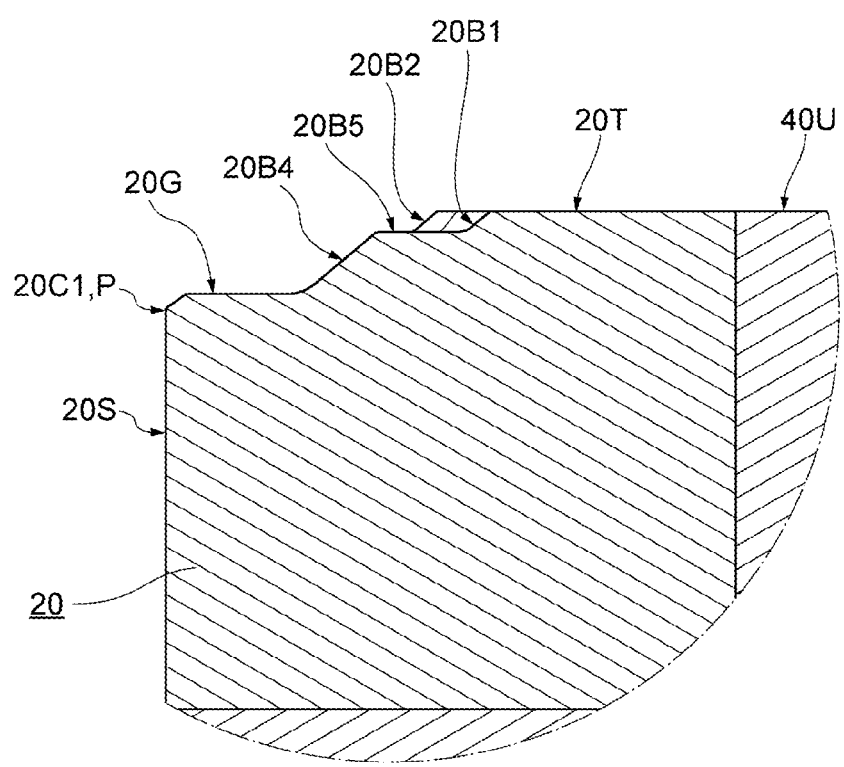
FIG. 5 is a cross-sectional view in which the cutting insert according to the embodiment is cut with an imaginary plane.

FIG. 1 is a perspective view of a cutting insert 10 according to the present embodiment, and FIG. 2 is an enlarged perspective view of the cutting insert 10 corresponding to an area A of FIG. 1. FIG. 3 is a plan view when the cutting insert 10 is viewed from a direction facing an end surface. FIG. 4 is a front view when the cutting insert 10 is viewed from a direction which faces a side surface and is parallel to an imaginary plane IP described later. FIG. 5 is a cross-sectional view in which the cutting insert 10 is cut with the imaginary plane IP.

The cutting insert 10 can be formed into a polygonal shape in an end view (top view) when viewed from a direction which faces an upper end surface 10U (or a boss surface 20T of a cutting edge member 20 or an upper end surface 40U of a base insert 40) and, as shown in the end view of FIG. 3, the cutting insert 10 in the present embodiment is formed into a rhombic shape which has two acute (e.g., 80 degrees) corner portions 10C1 and 10C2, and two obtuse (e.g., 100 degrees) corner portions. As shown in the drawing, in the cutting insert 10, a through hole 10H which passes through the center of each of the upper end surface 10U and a lower end surface 10L (FIG. 4) which face each other is formed, and the cutting insert 10 is formed so as to be 180 degrees rotationally symmetric with respect to a central axis AX of the through hole 10H.

The cutting insert 10 includes the base insert 40 and, at positions corresponding to the corner portion 10C1 and the corner portion 10C2, two cutting edge members 20 constituted by ultra-high pressure sintered bodies fixed to the base insert 40 are provided. Accordingly, after a cutting edge of one of the cutting edge members 20 is worn, it is possible to use the other cutting edge member 20 by replacing the corner portion 10C1 with the corner portion 10C2.

Note that the cutting tool may also be provided by fixing the cutting edge member to a holder of a single point tool or an end mill (an example of the cutting tool) by brazing or the like without using the cutting insert.

The cutting edge member 20 in the present embodiment includes a sintered body containing cubic boron nitride and a coating film with which the surface of the sintered body is coated. It is possible to deposit the coating film on the surface of the sintered body by, e.g., physical vapor deposition (PVD) or chemical vapor deposition (CVD). Note that the cutting edge member 20 may not be coated with the coating film. In addition, the cutting edge member 20 may also be constituted by diamond or the like.

Hereinbelow, the structure of the cutting edge member 20 will be described in detail. Note that, for the convenience of description, there are cases where, of directions of the central axis AX of the through hole 10H, a direction from the center of the cutting insert 10 toward the lower end surface 10L serving as a seating surface for a shank holder 50 (FIG. 6) is referred to as downward in the direction of the central axis AX or simply referred to as downward, and a direction opposite to the above direction toward the upper end surface 10U to which the cutting edge member 20 of the cutting insert 10 is mounted is referred to as upward in the direction of the central axis AX or simply referred to as upward. In addition, there are cases where an end portion or the like on an upper side (lower side) is referred to as an upper end (lower end) or an upper end portion (lower end portion). In addition, there are cases where, of directions parallel to the imaginary plane IP in the end view (FIG. 3), a direction from the center of the cutting insert 10 toward the cutting edge member 20 mounted to the corner portion 10C1 is referred to as front, and a direction toward the cutting edge member 20 mounted to the opposite corner portion 10C2 is referred to as rear. In the present embodiment, a direction facing the upper end surface 10U of the cutting insert 10 substantially matches the direction of the central axis AX, and a direction facing a side surface of the cutting insert 10 substantially matches a direction perpendicular to the central axis AX.

The cutting edge member 20 has an upper end surface 20U which corresponds to a surface on the upper side in the direction of the central axis AX, a lower end surface 20L which corresponds to a surface on the lower side in the direction of the central axis AX, and a side surface 20S which connects the upper end surface 20U and the lower end surface 20L. As shown in FIG. 2 or the like, the cutting edge member 20 according to the present embodiment is formed into a triangular prism shape having the upper end surface 20U as a top surface and having the lower end surface 20L as a bottom surface.

A connection portion is a portion which connects the upper end surface 20U and the side surface 20S. In the connection portion which connects the upper end surface 20U which is formed into a triangular shape in the end view and the side surface 20S, a corner portion 20C1 corresponding to one vertex portion is formed into an arc shape, as shown in FIG. 2 and FIG. 3. In the corner portion 20C1, an arc-shaped corner cutting edge is formed. In the present embodiment, the central angle of an arc which approximates the corner portion 20C1 is set to, e.g., not less than 25 degrees and less than 90 degrees (e.g., 80 degrees). In each of a straight portion 20C2 and a straight portion 20C3 connected to end portions of the corner portion 20C1, a linear straight cutting edge is formed.

In the present embodiment, the cutting edge member 20 is formed to be symmetric with respect to the imaginary plane IP determined so as to halve the corner portion 20C1. Accordingly, as shown in FIG. 3 or the like, the upper end surface 20U is formed into an isosceles triangular shape having the corner portion 20C1 as a vertex in the end view. Note that the imaginary plane IP includes the central axis AX of the through hole 10H. It is assumed that an intersection point of the imaginary plane IP and the corner portion 20C1 is represented by an intersection point P (FIG. 3).

As shown in FIG. 2, the upper end surface 20U includes a boss surface 20T, a breaker bottom surface 20G, and a breaker wall surface which is provided in an area which connects the breaker bottom surface 20G and the boss surface 20T.

The boss surface 20T is a surface which is formed perpendicularly to the direction of the central axis AX so as to be flush with the upper end surface 40U of the base insert 40 (i.e., so as to have the same height with respect to the direction of the central axis AX). The boss surface 20T corresponds to, of surfaces of the cutting edge member 20, a surface positioned at the upper end in the direction of the central axis AX, and hence the boss surface 20T may be referred to as a top surface. In the end view, the boss surface 20T according to the present embodiment has an area which is depressed to the rear such that a distance to the intersection point P is increased in an area intersecting the imaginary plane IP, and two areas which are protruded to the front so as to hold the above area between the two areas such that a distance to the intersection point P in a direction parallel to the imaginary plane IP is reduced in an area spaced apart from the imaginary plane IP.

The breaker bottom surface 20G is a surface which is adjacent to cutting edges including a corner cutting edge and a straight cutting edge in the upper end surface 20U, and at least part of the breaker bottom surface 20G functions also as a rake face. The breaker bottom surface 20G is provided in an area below the boss surface 20T.

A breaker wall surface 20B is a surface which is provided in an area which connects the breaker bottom surface 20G and the boss surface 20T, and includes at least a first wall surface 20B1, a second wall surface 20B2, a third wall surface 20B3, and a fourth wall surface 20B4.

The first wall surface 20B1 is a concave surface which is provided at a position through which the imaginary plane IP passes and is formed so as to be depressed in a direction (rear) away from the intersection point P in the end view, or, in the end view, in a direction toward the central axis AX serving as the center of the cutting insert 10 in the end view. As shown in a cross-sectional view of FIG. 5, in the cross-sectional view which is cut with the imaginary plane IP, the first wall surface 20B1 is formed to be inclined with respect to the direction of the central axis AX such that the first wall surface 20B1 advances to the rear and moves upward as a distance from the intersection point P is increased.

The second wall surface 20B2 is a convex surface which is provided at a position spaced apart from the imaginary plane IP so as to be connected directly or indirectly to the first wall surface 20B1. In addition, the second wall surface 20B2 is formed to be protruded to the front or outward, i.e., in the end view, in a direction away from the center of the cutting insert 10 in the end view, or in a direction toward the intersection point P or the side surface 20S in the end view. As shown in the cross-sectional view of FIG. 5, in the cross-sectional view which is cut with the imaginary plane IP, the second wall surface 20B2 is formed to be inclined with respect to the direction of the central axis AX so as to move upward as the distance from the intersection point P is increased.

The third wall surface 20B3 is a convex surface which is formed on a side opposite to the side of the second wall surface 20B2 such that the third wall surface 20B3 and the second wall surface 20B2 are symmetric with respect to the imaginary plane IP. That is, the second wall surface 20B2 and the third wall surface 20B3 are disposed on both sides of the imaginary plane IP. The second wall surface 20B2 is formed such that the second wall surface 20B2 and the third wall surface 20B3 are symmetric with respect to the imaginary plane IP, and hence it is possible to describe the structure of the third wall surface 20B3 by replacing the second wall surface 20B2 with the third wall surface 20B3 in the description. Accordingly, the description of the third wall surface 20B3 will be omitted.

Figure 7:
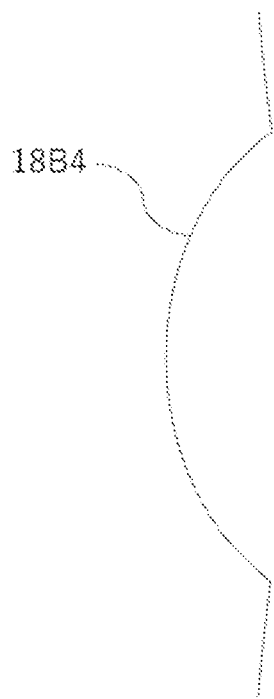
FIG. 7 is a partial cross-sectional view of a line obtained by cutting the fourth wall surface with a second imaginary plane perpendicular to the imaginary plane.

The fourth wall surface 20B4 is provided in an area which is positioned between the first wall surface 20B1 and the intersection point P in the end view, and through which the imaginary plane IP passes. The fourth wall surface 20B4 is a convex surface which is provided to be protruded in the end view in a direction away from the center of the cutting insert 10 in the end view, or in a direction toward the intersection point P or the side surface 20S. Further, as shown in a side view of FIG. 4, the fourth wall surface 20B4 has a height which is smaller than heights of the second wall surface 20B2, the third wall surface 20B3, and the first wall surface 20B1. In addition, the fourth wall surface 20B4 is formed to have an arc or an elliptical arc 18B4 in a cross-sectional view which is cut with a plane perpendicular to the central axis AX (an example of a second imaginary plane), as shown in FIG. 7. The arc or the elliptical arc 18B4 is formed to be symmetric with respect to the line of intersection of the above plane perpendicular to the central axis AX and the imaginary plane IP. Note that the imaginary plane IP and the second imaginary plane intersect each other perpendicularly.

In the present embodiment, the fourth wall surface 20B4 is implemented as a conical surface of a conical protrusion having a height lower than that of the boss surface 20T. Accordingly, the fourth wall surface 20B4 has an arc-shaped cross section having a radius which reduces as the fourth wall surface 20B4 advances upward in the direction of the central axis AX.

A connection surface 20B5 is a surface which is provided behind the protrusion and thereby connects the fourth wall surface 20B4 and the first wall surface 20B1.

Herein, each of the second wall surface 20B2 and the third wall surface 20B3 is a surface with which chips collide in the case where cutting having a relatively small depth of cut (e.g., 0.2 mm or less) is mainly performed, and hence each of the second wall surface 20B2 and the third wall surface 20B3 can function as a breaker wall surface. The first wall surface 20B1 is a surface with which at least some of chips having collided with the second wall surface 20B2 or the third wall surface 20B3 collide in the case where cutting having a relatively small depth of cut is mainly performed, and hence the first wall surface 20B1 can function as a breaker wall surface. Note that the first wall surface 20B1 may also be provided such that chips having collided with the second wall surface 20B2 or the third wall surface 20B3 don't collide with the first wall surface 20B1.

On the other hand, a pair of the second wall surface 20B2 and the fourth wall surface 20B4 or a pair of the third wall surface 20B3 and the fourth wall surface 20B4 are surfaces with which chips collide in the case where cutting having a relatively large depth of cut (e.g., 0.2 mm or more and 0.3 mm or less) is mainly performed, and the surfaces can function as breaker wall surfaces.

Note that the curvature of an arc which appears when the fourth wall surface 20B4 is cut with the plane perpendicular to the central axis AX (or the curvature of an arc which approximates a curve which appears when the fourth wall surface 20B4 is cut with the plane perpendicular to the central axis AX) may be larger than the curvature of an arc which approximates the corner portion 20C1 or may also be smaller than the curvature thereof.

In addition, the second wall surface 20B2, the first wall surface 20B1, and the third wall surface 20B3 may not necessarily be smoothly connected to each other, and may also be connected to each other via different curved surfaces or planes.

As shown in FIG. 5, the corner portion 20C1 in which the cutting edge is formed is shown in a cross section obtained by cutting the cutting insert 10 with the imaginary plane IP. Note that the corner portion 20C1 may be subjected to honing. Further, the cross-sectional view shows the breaker bottom surface 20G provided between the corner portion 20C1 and the fourth wall surface 20B4. In the present embodiment, the breaker bottom surface 20G is provided substantially perpendicularly to the direction of the central axis AX. Note that the breaker bottom surface 20G may also be formed so as to be inclined downward such that a positive rake angle is provided. Furthermore, the cross-sectional view shows the fourth wall surface 20B4 which is connected to the breaker bottom surface 20G and moves upward with distance from the corner portion 20C1, and the connection surface 20B5 which connects the fourth wall surface 20B4 and the first wall surface 20B1. In the present embodiment, the connection surface 20B5 is provided substantially perpendicularly to the direction of the central axis AX in the cross-sectional view, and is provided so as to descend in a direction perpendicular to the cross section. The cross-sectional view shows the first wall surface 20B1 which is connected to the connection surface 20B5 and moves upward with distance from the corner portion 20C1, and the boss surface 20T which is connected to the first wall surface 20B1. The boss surface 20T is provided above the fourth wall surface 20B4, i.e., provided so as to have a height larger than the height of the fourth wall surface 20B4.

The side surface 20S functions as a flank for the cutting edge formed in each of the corner portion 20C1, the straight portion 20C2, and the straight portion 20C3. The side surface 20S according to the present embodiment is formed to be flush with a side surface 40S of the base insert 40. In addition, a surface of the side surface 20S which faces the rear side is fixed to the base insert 40 by a known method.

The lower end surface 20L is a surface which is fixed to the base insert 40 by a known method.

Next, an example of the cutting tool according to the present embodiment will be described.

Figure 6:
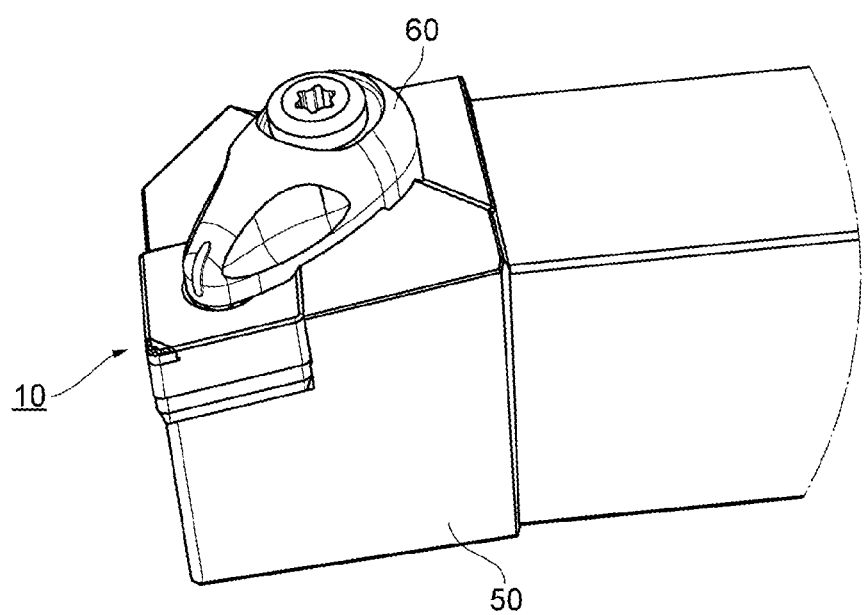
FIG. 6 is a perspective view of a cutting tool according to the embodiment.

FIG. 6 is an enlarged perspective view of a turning tool 100 serving as the cutting tool according to the present embodiment. The turning tool 100 includes the cutting insert 10 to which the cutting edge member 20 constituted by the sintered body is mounted, the shank holder 50 which holds the cutting insert 10, and a clamp 60 serving as an example of a holding member for causing the shank holder 50 to hold the cutting insert 10.

The present invention can be applied to a turning tool for inner diameter machining, outer diameter machining, screw cutting, or grooving. In addition, the present invention can be applied to a rotating tool such as a milling cutter.

In addition, it is possible to use various known means as the holding member for causing the holder to hold the cutting insert. The clamp 60 according to the present embodiment is an insert clamp which causes the shank holder 50 to hold the cutting insert 10 by drawing the cutting insert 10 into the shank holder 50 using a tip portion inserted into the through hole 10H. However, other known means may also be used. For example, the holder may be caused to hold the cutting insert by forming a female thread in the holder and using a clamp screw.

Hereinbelow, a description will be given of an operation when a workpiece serving as a material to be cut is cut by using the turning tool 100 according to the present embodiment.

First, a description will be given of the case where a depth of cut is small (e.g., 0.2 mm or less).

The cutting insert 10 can be used as a right-side or left-side cutting tool and, when the cutting insert 10 is used as the right-side cutting tool, the third wall surface 20B3 disposed on the right side when viewed from the side of the corner portion 10C1 or the corner portion 20C1 cooperates with the first wall surface 20B1 to operate on chips. When the cutting insert 10 is used as the left-side cutting tool, the second wall surface 20B2 disposed on the left side when viewed from the side of the corner portion 10C1 or the corner portion 20C1 cooperates with the first wall surface 20B1 to operate on chips.

Herein, the operation when the cutting insert 10 is used as the right-side cutting tool will be described and, an operation when the cutting insert 10 is used as the left-side cutting tool is the same as the above operation, and hence the description thereof will be omitted. In general, in cutting by the cutting tool including the cutting edge constituted by the ultra-high pressure sintered body, especially lathe machining or milling, a depth of cut and a feed rate serving as cutting conditions are set to small values. Accordingly, generated chips are narrow in width and small in thickness, and hence it easily becomes extremely difficult to perform a chip control process. In particular, when copying is performed with a lathe, there are cases where chips generated by the cutting edge of the corner portion 20C1 significantly change during cutting, and a direction in which chips flow out significantly changes. Accordingly, it easily becomes extremely difficult to perform the chip control process.

In the cutting edge member 20 of the cutting insert 10 in the present embodiment, when chips are generated in the vicinity of the center of the corner portion 20C1, i.e., when chips are generated in the vicinity of the imaginary plane IP which is a bisector of the corner portion 20C1, the chips flow toward the first wall surface 20B1 from the corner portion 20C1. At this point, as compared with the first wall surface 20B1, the third wall surface 20B3 is protruded toward the corner portion 20C1, and hence at least some of the chips having flowed collide with the third wall surface 20B3. The third wall surface 20B3 is a curved surface which is expanded outward, and the first wall surface 20B1 which is curved so as to be depressed inward is disposed to be positioned adjacent to the third wall surface 20B3. Accordingly, at least some of the chips having collided with the third wall surface 20B3 receives a force which bends the chips also sideways toward the first wall surface 20B1, i.e., the imaginary plane IP in addition to a force which bends the chips upward by the breaker bottom surface 20G serving as the rake face. That is, the chips which flow from the corner portion 20C1 toward the first wall surface 20B1 are also bent sideways by a collision of the position of the chips which is displaced from the center with the third wall surface 20B3. As a result, as compared with the case where the chips receive only the upward force, the chips are separated more finely.

Herein, in the cutting edge member 20 in the present embodiment, in the end view (plan view), the outline of a boundary between the first wall surface 20B1 and the upper end of the third wall surface 20B3, i.e., the outlines of boundaries which connect the first wall surface 20B1 and the third wall surface 20B3 to the boss surface 20T are substantially arc-shaped. Similarly, in a horizontal cross section perpendicular to the direction of the central axis AX, the outlines of the first wall surface 20B1 and the third wall surface 20B3 are substantially arc-shaped. Accordingly, it is possible to suppress progress of wear (abrasion) caused by the collision of chips.

In addition, in the side view of FIG. 4 or the like, the fourth wall surface 20B4 has a height smaller than the heights of the second wall surface 20B2 and the third wall surface 20B3. Further, the fourth wall surface 20B4 is provided such that a horizontal width is reduced as the fourth wall surface 20B4 advances upward. Accordingly, it becomes possible to cause at least some of the chips to pass through a gap between the fourth wall surface 20B4 and the third wall surface 20B3.

Next, a description will be given of the case where a depth of cut is large (e.g., 0.2 mm or more and 0.3 mm or less). The inventors of the present application have focused attention on the fact that, when the depth of cut is gradually increased, more chips flow out to a valley portion including the first wall surface 20B1 than a mountain portion including the third wall surface 20B3 and, as a result, there are cases where the chips are curled in the direction in which the chips flow out and are not broken.

When the depth of cut is increased, it becomes possible to hold the chips with the fourth wall surface 20B4 provided at a position closest from the corner portion 20C1. At least some of the chips are curved so as to stick to two convex surfaces of the fourth wall surface 20B4 and the third wall surface 20B3, and hence, in the chips, two curved portions are formed so as to form the shape of an Arabic FIG. 3.

Herein, by providing breaker wall surfaces which are the second wall surface 20B2, the third wall surface 20B3, and the fourth wall surface 20B4, such that the second wall surface 20B2, the third wall surface 20B3, and the fourth wall surface 20B4 include arcs when the wall surfaces are cut with the imaginary plane perpendicular to the direction of the central axis AX, it becomes possible to suitably curve the chips. At least some of the curved chips are curled in a direction perpendicular to a direction in which the chips flow out, collide with an end surface of a workpiece or the flank of the cutting insert 10, and are broken.

As described above, according to the present invention, it becomes possible to provide the cutting insert and the cutting tool each having improved chip control. In particular, it becomes possible to improve chip control in a wide range of cutting conditions.

In addition, the present invention can be variously modified without departing from the gist thereof. Within the scope of ordinary creation ability of those skilled in the art, some components in a given embodiment can be added to another known configuration. In addition, some components in a given embodiment may also be replaced with components of another known configuration. For example, a finishing blade portion such as a wiper blade may be provided in the cutting edge portion. In addition, it is only required that the first wall surface 20B1, the second wall surface 20B2, the third wall surface 20B3, and the fourth wall surface 20B4 which serve as breaker wall surfaces are provided in an area with which chips are supposed to collide. For example, the first wall surface 20B1, the second wall surface 20B2, and the third wall surface 20B3 may be formed at least in upper portions of wall surfaces. At this point, lower ends of the wall surfaces may be formed into other shapes in a range which does not influence chip control.

What is claimed is:

1. A cutting tool comprising a cutting edge member, wherein
   the cutting edge member includes:
   a cutting edge which is formed in a corner portion of a connection portion which connects an end surface and a side surface;
   a first wall surface which includes a concave surface which is provided at a position through which an imaginary plane determined so as to halve the corner portion passes, and is formed to be depressed in a direction away from an intersection point of the imaginary plane and the corner portion in an end view when viewed from a direction facing the end surface;
   a second wall surface which includes a convex surface which is provided to be connected to the first wall surface at a position spaced apart from the imaginary plane, and is protruded in a direction opposite to the direction in which the concave surface is depressed in the end view;
   a third wall surface which includes a convex surface which is provided to be connected to the first wall surface at a position spaced apart from the imaginary plane on an opposite side to the second wall surface across to the imaginary plane, and is protruded in a direction opposite to the direction in which the concave surface is depressed in the end view; and
   a fourth wall surface which is provided in an area which is between the first wall surface and the intersection point in the end view and through which the imaginary plane passes, includes a convex surface which is protruded in a direction opposite to the direction in which the concave surface is depressed in the end view, and has a height smaller than heights of the second wall surface and the third wall surface in a side view when viewed from a direction facing the side surface.

2. The cutting tool according to claim 1, wherein a line obtained by cutting the fourth wall surface with a second imaginary plane perpendicular to the imaginary plane has an arc shape or an elliptical arc shape.

3. The cutting tool according to claim 1, wherein
   a cross section obtained by cutting the cutting edge member with the imaginary plane shows:
   the corner portion;
   a breaker bottom surface which is provided between the corner portion and the fourth wall surface;
   the fourth wall surface which is connected to the breaker bottom surface and moves upward with increasing distance from the corner portion;
   a connection surface which is connected to the fourth wall surface;
   the first wall surface which is connected to the connection surface and moves upward with increasing distance from the corner portion; and
   a boss surface which is connected to the first wall surface and has a height larger than the height of the fourth wall surface.

4. The cutting tool according to claim 1, further comprising, in addition to the cutting edge member, a cutting insert which has a base insert to which the cutting edge member is mounted, wherein a through hole having a central axis which is present in the imaginary plane is formed in the base insert.

5. The cutting tool according to claim 1, further comprising, in addition to the cutting edge member, a cutting insert which has a base insert to which the cutting edge member is mounted, wherein the cutting insert is formed into a polygonal shape in the end view when viewed from the direction facing the end surface, and the corner portion is formed at a vertex of the polygonal shape.

6. The cutting tool according to claim 1, further comprising a holder which holds the cutting edge member.

* * * * *